(12) United States Patent  (10) Patent No.: US 8,527,760 B2
Faiman et al.  (45) Date of Patent: Sep. 3, 2013

(54) DETERMINING TRUST DATA FOR DEVICES IN A NETWORK

(75) Inventors: Nathan G. Faiman, Rochester, MN (US); Michael T. Kalmbach, Elgin, MN (US); Jared W. Patterson, Rochester, MN (US); Kevin Wendzel, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 225 days.

(21) Appl. No.: 13/013,098

(22) Filed: Jan. 25, 2011

(65) Prior Publication Data

US 2012/0192251 A1  Jul. 26, 2012

(51) Int. Cl.
*H04L 9/32* (2006.01)
(52) U.S. Cl.
USPC .......................... 713/168; 713/170; 713/178
(58) Field of Classification Search
USPC ......... 713/168–170, 166, 178, 175; 455/410, 455/411
See application file for complete search history.

(56) References Cited

U.S. PATENT DOCUMENTS

| | | | |
|---|---|---|---|
| 5,218,637 A | 6/1993 | Angebaud et al. | |
| 5,623,600 A | 4/1997 | Ji et al. | |
| 5,787,172 A | 7/1998 | Arnold | |
| 5,872,847 A | 2/1999 | Boyle et al. | |
| 6,108,788 A | 8/2000 | Moses et al. | |
| 6,212,636 B1 | 4/2001 | Boyle et al. | |
| 7,519,818 B2 * | 4/2009 | Levin et al. | 713/170 |
| 7,788,707 B1 * | 8/2010 | Zhou | 726/4 |
| 2008/0155644 A1 * | 6/2008 | Baranov et al. | 726/1 |
| 2010/0218236 A1 * | 8/2010 | Hardjono et al. | 726/3 |
| 2010/0262706 A1 * | 10/2010 | Rodriguez et al. | 709/229 |
| 2011/0078775 A1 * | 3/2011 | Yan | 726/6 |

OTHER PUBLICATIONS

Leszek Lilien et al., "The Pervasive Trust Foundation for Security in Next Generation Networks (A Position Paper)," NSPW 2010, Sep. 21-23, 2010, pp. 1-13, ACM, Concord, MA USA.

* cited by examiner

*Primary Examiner* — Nirav B Patel
(74) *Attorney, Agent, or Firm* — Owen J. Gamon (57) ABSTRACT

In an embodiment, a first device detects a first interaction between the first device and a second device. The first device assigns a first rating of the first interaction. The first device calculates an internal trust for the second device based on the first rating and a first time since the occurrence of the first interaction. The first device receives trust data from a third device. The first device calculates a community trust for the second device based on the trust data and an internal trust that the first device has for the third device. The first device calculates a total trust that the first device has for the second device based on the community trust and the internal trust that the first device has for the second device. If the total trust is less than a minimum threshold, the first device disallows a second interaction.

15 Claims, 5 Drawing Sheets

| RATING DATA FOR INTERACTIONS BETWEEN DEVICE X AND OTHER DEVICES ||| |
|---|---|---|---|
| 320 | 322 | 324 | |
| DEVICE ID | TIMESTAMPS | RATING OF INTERACTION | |
| Y | 11:05, 11:10 | 1, 4 | 302 |
| Z | 10:42, 11:55, 11:57 | 2, 5, 3 | 304 |

| RATING DATA FOR INTERACTIONS BETWEEN DEVICE Y AND OTHER DEVICES ||| |
|---|---|---|---|
| 420 | 422 | 424 | |
| DEVICE ID | TIMESTAMPS | RATING OF INTERACTION | |
| X | 11:05, 11:10 | 2, 3 | 402 |
| Z | 9:42, 9:55, 9:57 | 3, 6, 2 | 404 |

| RATING DATA FOR INTERACTIONS BETWEEN DEVICE Z AND OTHER DEVICES ||| |
|---|---|---|---|
| 520 | 522 | 524 | |
| DEVICE ID | TIMESTAMPS | RATING OF INTERACTION | |
| X | 10:42, 11:55, 11:57 | 1, 4, 6 | 502 |
| Y | 9:42, 9:55, 9:57 | 2, 3, 1 | 504 |

FIG. 5

TRUST DATA FOR DEVICE X — 156-1

| DEVICE ID (620) | INTERNAL TRUST (622) | COMMUNITY TRUST (624) | TOTAL TRUST (626) |
|---|---|---|---|
| Y | 6.1 | 5.2 | 7.3 | ← 602
| Z | 4.2 | 4.8 | 3.4 | ← 604

TRUST DATA FOR DEVICE Y — 156-2

| DEVICE ID (720) | INTERNAL TRUST (722) | COMMUNITY TRUST (724) | TOTAL TRUST (726) |
|---|---|---|---|
| X | 2.4 | 4.5 | 3.2 | ← 702
| Z | 6.8 | 3.1 | 6.1 | ← 704

TRUST DATA FOR DEVICE Z — 156-3

| DEVICE ID (820) | INTERNAL TRUST (822) | COMMUNITY TRUST (824) | TOTAL TRUST (826) |
|---|---|---|---|
| X | 1.9 | 4.3 | 5.9 | ← 802
| Y | 3.7 | 5.1 | 5.2 | ← 804

DETERMINING TRUST DATA FOR DEVICES IN A NETWORK

FIELD

An embodiment of the invention generally relates to computer systems that exchange data.

BACKGROUND

Computer systems typically comprise a combination of computer programs and hardware, such as semiconductors, transistors, chips, circuit boards, storage devices, and processors. The computer programs are stored in the storage devices and are executed by the processors. Computers are often connected in networks, such as the Internet, and a user at one computer, often called a client, may wish to access information at multiple other computers, often called servers, via a network. Although this connectivity can be of great benefit to authorized users, it also provides an opportunity for unauthorized persons (often called intruders, attackers, or hackers) to access, break into, or misuse computers through the use of malicious programs. This connectivity also provides an increased chance that a computer will receive data or programs that contain inadvertent errors.

SUMMARY

A method, computer-readable storage medium, and computer system are provided. In an embodiment, a first device detects a first interaction between the first device and a second device. The first device assigns a first rating of the first interaction. The first device calculates an internal trust that the first device has for the second device based on the first rating and a first time since the occurrence of the first interaction. The first device receives trust data from a third device. The first device calculates a community trust for the second device based on the trust data and an internal trust that the first device has for the third device. The first device calculates a total trust that the first device has for the second device based on the community trust and the internal trust that the first device has for the second device. If the total trust is less than a minimum threshold, the first device disallows a second interaction between the first device and the second device.

It is to be noted, however, that the appended drawings illustrate only example embodiments of the invention, and are therefore not considered a limitation of the scope of other embodiments of the invention.

DETAILED DESCRIPTION

Figure 1:
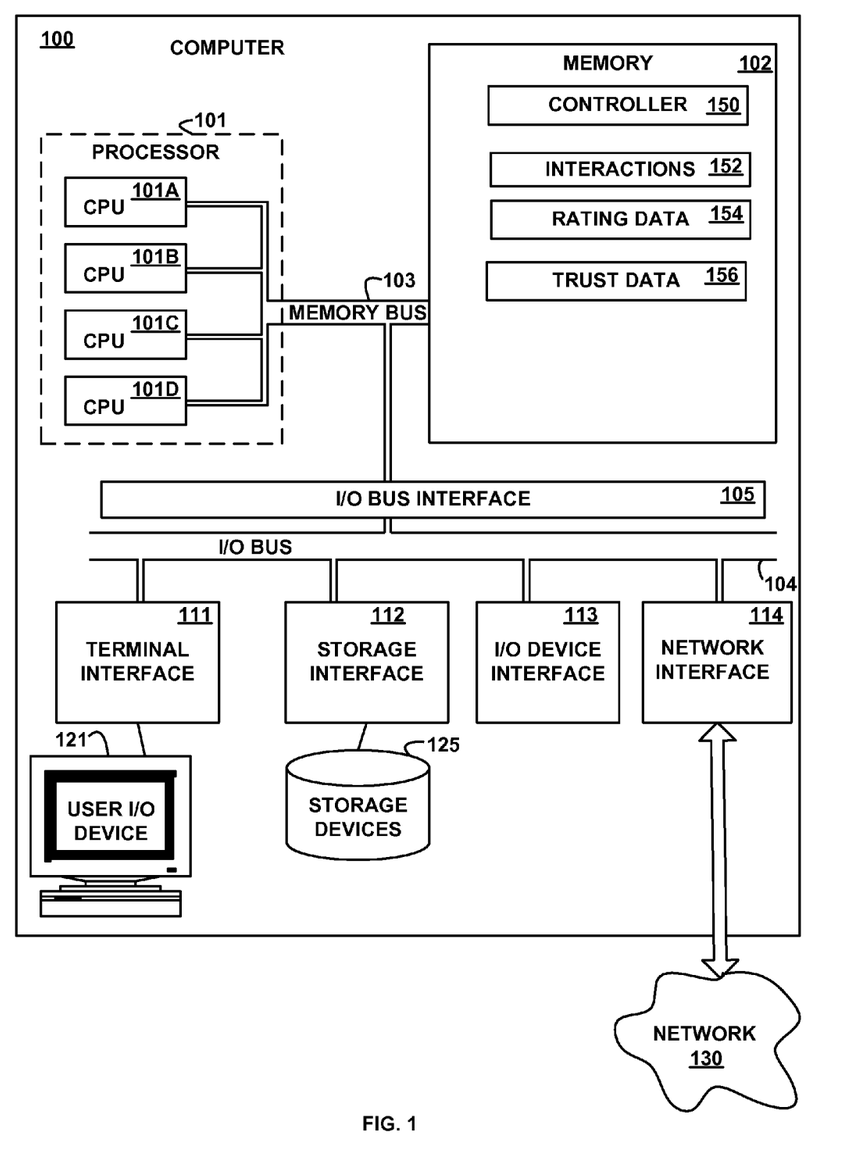
FIG. 1 depicts a high-level block diagram of an example system for implementing an embodiment of the invention.

Referring to the Drawings, wherein like numbers denote like parts throughout the several views, FIG. 1 depicts a high-level block diagram representation of a computer system 100 connected to a network 130, according to an embodiment of the present invention. The mechanisms and apparatus of embodiments of the present invention apply equally to any appropriate computing system.

The major components of the computer system 100 comprise one or more processors 101, a main memory 102, a terminal interface 111, a storage interface 112, an I/O (Input/Output) device interface 113, and a network adapter 114, all of which are communicatively coupled, directly or indirectly, for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may comprise one or more levels of on-board cache.

In an embodiment, the main memory 102 may comprise a random-access semiconductor memory, storage device, or storage medium for storing or encoding data and programs. In another embodiment, the main memory 102 represents the entire virtual memory of the computer system 100, and may also include the virtual memory of other computer systems coupled to the computer system 100 or connected via the network 130. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The main memory 102 stores or encodes a controller 150, interactions 152, rating data 154, and trust data 156. Although the controller 150, the interactions 152, the rating data 154, and the trust data 156 are illustrated as being contained within the memory 102 in the computer system 100, in other embodiments some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the controller 150, the interactions 152, the rating data 154, and the trust data 156 are illustrated as being contained within the main memory 102, these elements are not necessarily all completely contained in the same storage device at the same time. Further, although the controller 150, the interactions 152, the rating data 154, and the trust data 156 are illustrated as being separate entities, in other embodiments some of them, portions of some of them, or all of them may be packaged together.

In an embodiment, the controller 150 comprises instructions or statements that execute on the processor 101 or instructions or statements that are interpreted by instructions or statements that execute on the processor 101, to carry out the functions as further described below with reference to FIGS. 2, 3, 4, 5, 6, 7, 8, and 9. In another embodiment, the controller 150 is implemented in hardware via semiconductor devices, chips, logical gates, circuits, circuit cards, and/or other physical hardware devices in lieu of, or in addition to, a processor-based system. In an embodiment, the controller 150 comprises data in addition to instructions or statements. In various embodiments, the controller 150 is a user application, a third-party application, an operating system, or any portion, multiple, or combination thereof.

In an embodiment, the interactions 152 comprise any operations, functions, methods, commands, requests, or responses that send or receive data, documents, scripts, executable code, interpretable statements, or any portion, combination, or multiple thereof to another computer system or electronic device via the network 130. An interaction between two electronic devices may be defined or measured according to any parameters, such as an amount of time used by the interaction, the number of data packets exchanged by the interaction, or an amount of data exchanged by the interaction.

The memory bus 103 provides a data communication path for transferring data between the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104.

The I/O interface units support communication with a variety of storage and I/O devices. For example, the terminal interface unit 111 supports the attachment of one or more user I/O devices 121, which may comprise user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 121 and the computer system 100, and may receive output data via the user output devices. For example, a user interface may be presented via the user I/O device 121, such as displayed on a display device, played via a speaker, or printed via a printer.

The storage interface unit 112 supports the attachment of one or more disk drives or direct access storage devices 125 (which are typically rotating magnetic disk drive storage devices, although they could alternatively be other storage devices, including arrays of disk drives configured to appear as a single large storage device to a host computer). In another embodiment, the storage device 125 may be implemented via any type of secondary storage device. The contents of the main memory 102, or any portion thereof, may be stored to and retrieved from the storage device 125, as needed. The I/O device interface 113 provides an interface to any of various other input/output devices or devices of other types, such as printers or fax machines. The network adapter 114 provides one or more communications paths from the computer system 100 to other digital devices; such paths may comprise, e.g., one or more networks 130.

Although the memory bus 103 is shown in FIG. 1 as a relatively simple, single bus structure providing a direct communication path between the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may, in fact, contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 is implemented as a desktop computer, portable computer, laptop or notebook computer, tablet computer, pocket computer, telephone, smart phone, pager, automobile, teleconferencing system, appliance, or any other appropriate type of electronic device.

The network 130 may be any suitable network or combination of networks and may support any appropriate protocol suitable for communication of data and/or code to/from the computer system 100. In various embodiments, the network 130 may represent a storage device or a combination of storage devices, either connected directly or indirectly to the computer system 100. In another embodiment, the network 130 may support wireless communications. In another embodiment, the network 130 may support hard-wired communications, such as a telephone line or cable. In another embodiment, the network 130 may be the Internet and may support IP (Internet Protocol). In another embodiment, the network 130 is implemented as a local area network (LAN) or a wide area network (WAN). In another embodiment, the network 130 is implemented as a hotspot service provider network. In another embodiment, the network 130 is implemented an intranet. In another embodiment, the network 130 is implemented as any appropriate cellular data network, cell-based radio network technology, or wireless network. In another embodiment, the network 130 is implemented as any suitable network or combination of networks. Although one network 130 is shown, in other embodiments any number of networks (of the same or different types) may be present.

FIG. 1 is intended to depict the representative major components of the computer system 100 and the network 130. But, individual components may have greater complexity than represented in FIG. 1, components other than or in addition to those shown in FIG. 1 may be present, and the number, type, and configuration of such components may vary. Several particular examples of such additional complexity or additional variations are disclosed herein; these are by way of example only and are not necessarily the only such variations. The various program components illustrated in FIG. 1 and implementing various embodiments of the invention may be implemented in a number of manners, including using various computer applications, routines, components, programs, objects, modules, data structures, etc., and are referred to hereinafter as "computer programs," or simply "programs."

The computer programs comprise one or more instructions or statements that are resident at various times in various memory and storage devices in the computer system 100 and that, when read and executed by one or more processors in the computer system 100 or when interpreted by instructions that are executed by one or more processors, cause the computer system 100 to perform the actions necessary to execute steps or elements comprising the various aspects of embodiments of the invention. Aspects of embodiments of the invention may be embodied as a system, method, or computer program product. Accordingly, aspects of embodiments of the invention may take the form of an entirely hardware embodiment, an entirely program embodiment (including firmware, resident programs, micro-code, etc., which are stored in a storage device) or an embodiment combining program and hardware aspects that may all generally be referred to herein as a "circuit," "module," or "system." Further, embodiments of the invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (an non-exhaustive list) of the computer-readable storage media may comprise: an electrical connection having one or more wires, a portable computer diskette, a hard disk (e.g., the storage device 125), a random access memory (RAM) (e.g., the memory 102), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may comprise a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, Radio Frequency, or any suitable combination of the foregoing.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the invention are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks.

The computer programs defining the functions of various embodiments of the invention may be delivered to a computer system via a variety of tangible computer-readable storage media that may be operatively or communicatively connected (directly or indirectly) to the processor or processors. The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which comprises one or more executable instructions for implementing the specified logical function(s). In some embodiments, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the invention may also be delivered as part of a service engagement with a client corporation, nonprofit organization, government entity, or internal organizational structure. Aspects of these embodiments may comprise configuring a computer system to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described hereinafter may be identified based upon the application for which they are implemented in a specific embodiment of the invention. But, any particular program nomenclature that follows is used merely for convenience, and thus embodiments of the invention are not limited to use solely in any specific application identified and/or implied by such nomenclature. The exemplary environments illustrated in FIG. 1 are not intended to limit the present invention. Indeed, other alternative hardware and/or program environments may be used without departing from the scope of embodiments of the invention.

Figure 2:
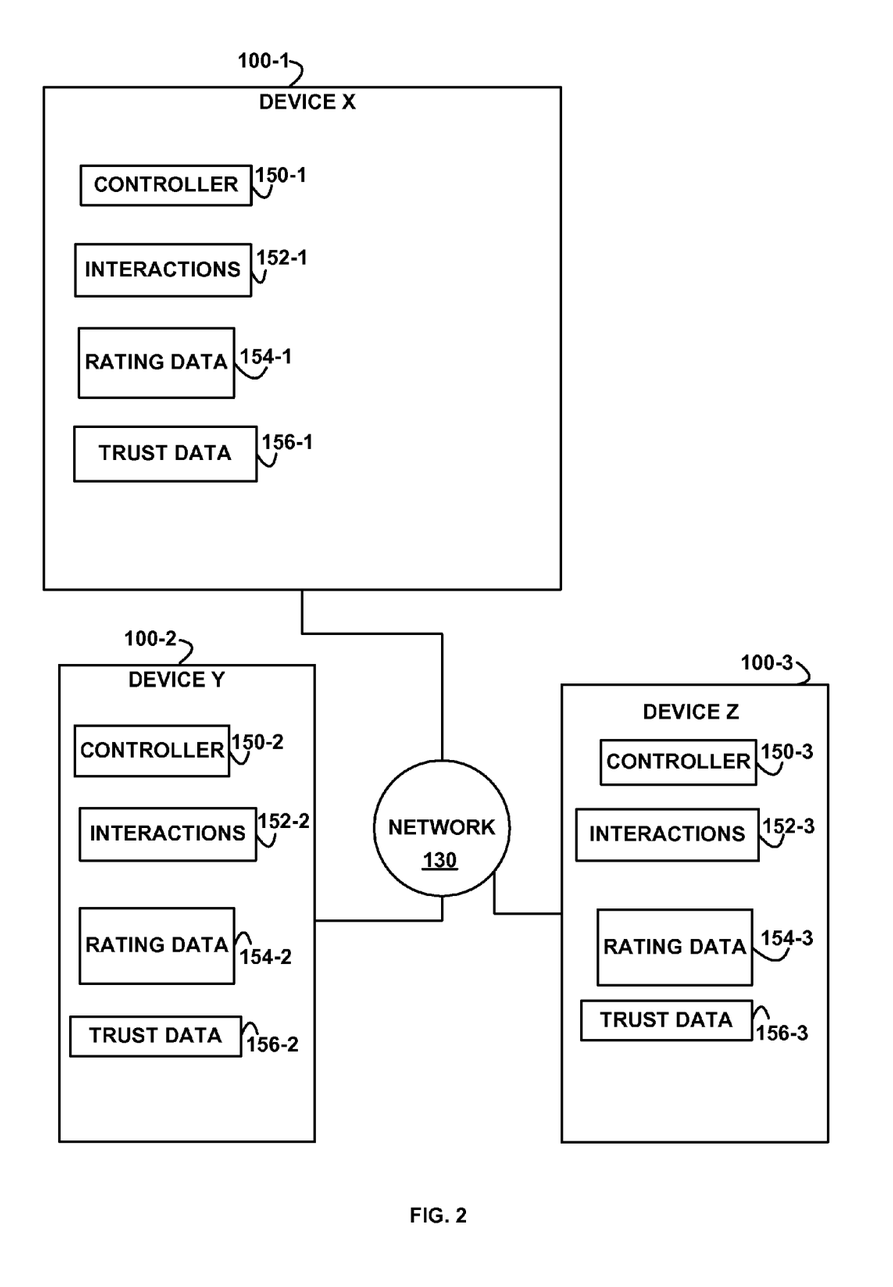
FIG. 2 depicts a block diagram of an example network of computer systems, according to an embodiment of the invention.

FIG. 2 depicts a block diagram of an example network of computer systems 100-1, 100-2, and 100-3 connected to the network 130, according to an embodiment of the invention. The computer systems 100-1, 100-2, and 100-3 are examples of, and are generically referred to by, the computer system 100 (FIG. 1). The computer system 100-1, which is identified by "device X," comprises a controller 150-1, interactions 152-1, rating data 154-1, and trust data 156-1. The computer system 100-2, which is identified by "device Y," comprises a controller 150-2, interactions 152-2, rating data 154-2, and trust data 156-2. The computer system 100-3, which is identified by "device Z," comprises a controller 150-3, interactions 152-3, rating data 154-3, and trust data 156-3. The controller 150-1, the controller 150-2, and the controller 150-3 are examples of, and are generically referred to by, the controller 150 (FIG. 1). The interactions 152-1, the interactions 152-2, and the interactions 152-3 are examples of, and are generically referred to by, the interactions 152 (FIG. 1). The rating data 154-1, the rating data 154-2, and the rating data 154-3 are examples of, and are generically referred to by, the rating data 154 (FIG. 1). The trust data 156-1, the trust data 156-2, and the trust data 156-3 are examples of, and are generically referred to by, the trust data 156 (FIG. 1).

Figure 3:
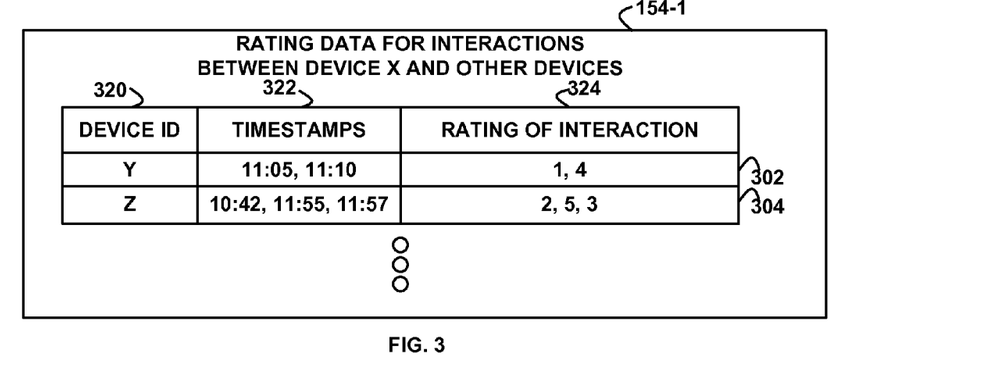
FIG. 3 depicts a block diagram of an example data structure for rating data for interactions between a device X and other devices, according to an embodiment of the invention.

FIG. 3 depicts a block diagram of an example data structure for rating data 154-1 for interactions between a device X and other devices, according to an embodiment of the invention. The rating data 154-1 comprises example records 302 and 304, each of which comprises a device identifier field 320, a timestamps field 322, and a rating field 324. The device identifier field 320 identifies a computer system connected to the network 130, with which the computer system 100-1 identified by the name "device X" has performed an interaction. The timestamps field 322 indicates the times and/or dates of the interactions 152 that the device X 100-1 performed with the computer identified by the device identifier field 320 in the same record. The rating 324 identifies the ratings that the controller 150 at the device X 100-1 assigned to the respective interactions 152 that occurred at the times/dates with the device 320 in the same record. In an embodiment, the rating of an interaction may be either positive or negative. A positive interaction rating increases the trust that a device has for another device. A negative interaction decreases the trust that a device has for another device.

In an embodiment, the controller 150-1 rates interactions 152 higher in proportion to the amount of data transferred as part of the interaction. Thus, the controller 150-1 gives a larger or more positive rating to interactions 152 that transfer a larger amount of data and a smaller or more negative rating to interactions 152 that transfer a smaller amount of data. In an embodiment, the controller 150-1 assigns a larger or more positive rating to interactions 152 initiated by the device X 100-1 at which the controller 150-1 executes and a smaller or more negative rating to interactions 152 initiated by the device identified by the device field 320. The controller 150-1 gives a smaller or more negative rating to interactions 152 where the device 320 provides data that is inaccurate, contains errors, contains malicious code, contains a virus or malware, comprises unsolicited email, comprises an attempt to procure confidential information, comprises a port scan, comprises a denial-of service attack (a number of interactions within a period of time that exceeds a threshold) and gives a larger or more positive rating to interactions 152 that are accurate, error free, or free of malicious code.

Figure 4:
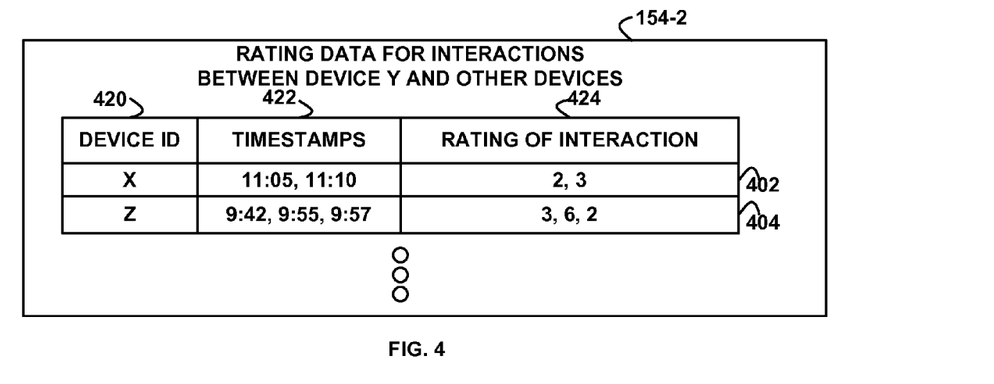
FIG. 4 depicts a block diagram of an example data structure for rating data for interactions between a device Y and other devices, according to an embodiment of the invention.

FIG. 4 depicts a block diagram of an example data structure for rating data 154-2 for interactions 152 between a device Y and other devices, according to an embodiment of the invention. The rating data 154-2 comprises example records 402 and 404, each of which comprises a device identifier field 420, a timestamps field 422, and a rating field 424. The device identifier field 420 identifies a computer system connected to the network 130, with which the computer system 100-2 identified by the name "device Y" has performed an interaction. The timestamps field 422 indicates the times and/or dates of the interactions 152 that the device Y 100-2 performed with the computer identified by the device identifier field 420 in the same record. The rating field 424 identifies the ratings that the controller 150-2 at the device Y 100-2 assigned to the respective interactions 152 that occurred at the times/dates with the device 420 in the same record.

The controller 150-2 at the device Y 100-2 may give the same or a different rating to an interaction as is given to the same interaction by the device 420 because the device Y 100-2 and the device 420 may use the same or a different criteria to rate the same interaction and may focus on the same or different data in the same interaction when making the rating. For example, the record 302 in FIG. 3 and the record 402 in FIG. 4 depict different ratings for the same interactions 152 that occur between the device X 100-1 and the device Y 100-2, with the record 402 depicting the ratings made by the device Y 100-2 and the record 302 depicting the ratings made by the device X 100-1. In an embodiment, the ratings may be different because while both devices use the same rating criteria, the devices may apply this same rating criteria against different data. For example, the data that device X 100-1 receives from the device Y 100-2 may be different from the data that device Y 100-2 receives from device X 100-1. In an embodiment, the ratings may be different because the devices use different rating criteria. For example, the device Y 100-2 may use a rating criteria that assigns a high positive rating to interactions 152 that have a large amount of data transferred, while the device X 100-1 may use a rating criteria that assigns a high positive rating to interactions 152 that are error free without regard to the amount of data transferred, or with the amount of data transferred being less important.

Figure 5:
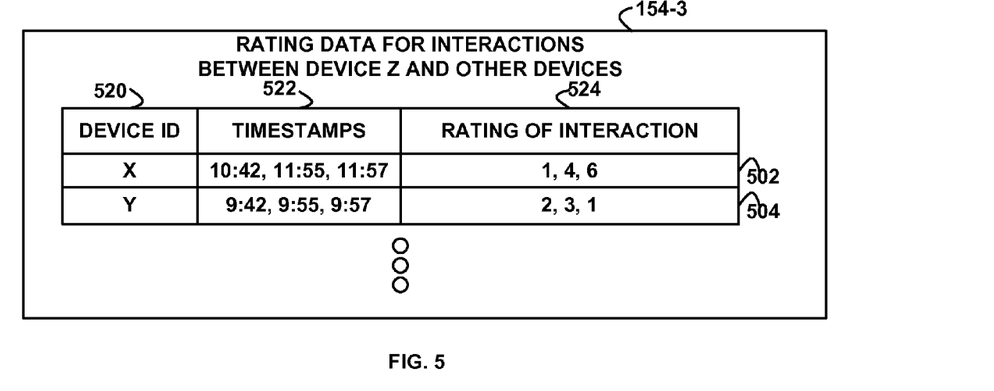
FIG. 5 depicts a block diagram of an example data structure for rating data for interactions between a device Z and other devices, according to an embodiment of the invention.

FIG. 5 depicts a block diagram of an example data structure for rating data 154-3 for interactions between a device Z and other devices, according to an embodiment of the invention. The rating data 154-3 comprises example records 502 and 504, each of which comprises a device identifier field 520, a timestamps field 522, and a rating field 524. The device identifier field 520 identifies a computer system connected to the network 130, with which the computer system 100-3 identified by the name "device Z" has performed an interaction. The timestamps field 522 indicates the times and/or dates of the interactions 152 that the device Z 100-3 performed with the computer identified by the device identifier field 520 in the same record. The rating field 524 identifies the ratings that the controller 150-3 at the device Z 100-3 assigned to the respective interactions 152 that occurred at the times/dates with the device 520 in the same record.

Figure 6:
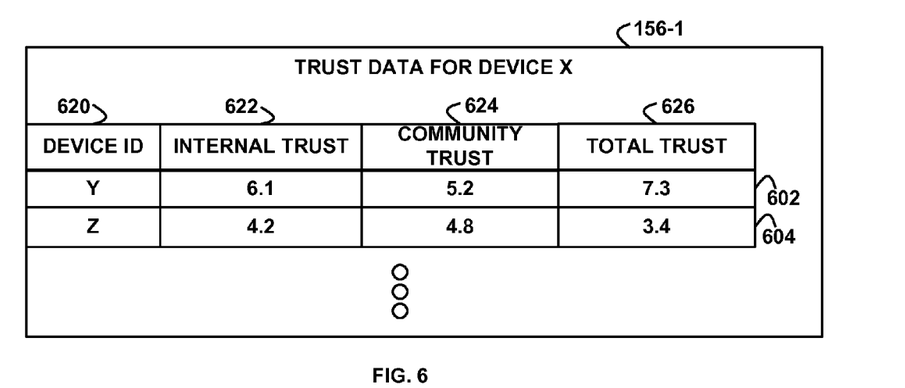
FIG. 6 depicts a block diagram of an example data structure for trust data for a device X, according to an embodiment of the invention.

FIG. 6 depicts a block diagram of an example data structure for trust data 156-1 for a device X, according to an embodiment of the invention. The trust data 156-1 comprises example records 602 and 604, each of which comprises an example device identifier field 620, an example internal trust field 622, an example community trust field 624, and an example total trust field 626. The device identifier field 620 identifies a computer device in the community of the device X 100-1. Examples of the devices identified by the device identifier field 620 include the device Y 100-2 and the device Z 100-3. The internal trust field 622 specifies the level of trust that the device X 100-1 has for the device identified by the device identifier 620 in the same record. The community trust field 624 is the aggregate trust that the community, to which the device X 100-1 belongs, has for the device identified by the device identifier 620 in the same record. The total trust field 626 is a function of the internal trust 622 and the community trust 624, in the same record. The controller 150-1 calculates the internal trust 622, the community trust 624, and the total trust 626, as further described below with reference to FIG. 9.

Trust means the level, degree, or amount of confidence that one device or a community of devices has that another device is providing accurate and non-malicious or non-harmful data and code. Each device assigns a trust value to other devices within the network. Each device sets a maximum and minimum value of trust. Values of trust at or near (within a threshold value of) the maximum trust indicate a trusted relationship. Values of trust at or near (within a threshold value of) the minimum trust indicate an un-trusted relationship. If a first device has no previous interactions 152 with a second device, then the first device defines default trust values for the second device.

Figure 7:
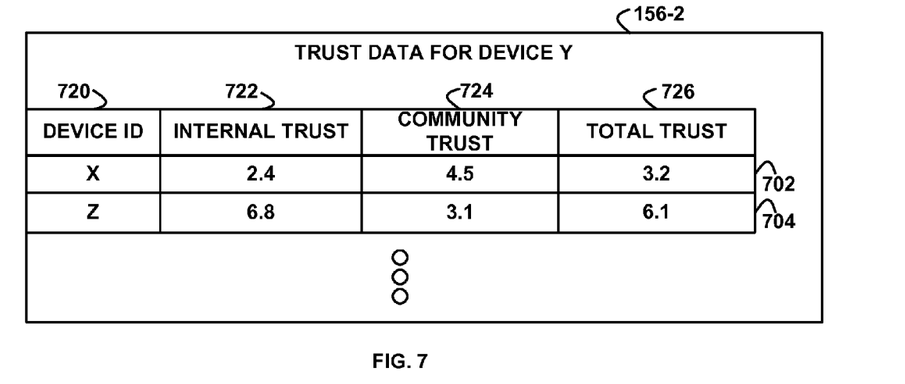
FIG. 7 depicts a block diagram of an example data structure for trust data for a device Y, according to an embodiment of the invention.

FIG. 7 depicts a block diagram of an example data structure for trust data 156-2 for a device Y, according to an embodiment of the invention. The trust data 156-2 comprises example records 702 and 704, each of which comprises an example device identifier field 720, an example internal trust field 722, an example community trust field 724, and an example total trust field 726. The device identifier field 720 identifies a computer device in the community of the device Y 100-2. Examples of the devices identified by the device identifier field 720 include the device X 100-1 and the device Z 100-3. The internal trust field 722 specifies the trust that the device Y 100-2 has for the device 720 in the same record. The community trust field 724 is the aggregate trust that the community to which the device Y 100-2 belongs has for the device 720 in the same record. The total trust field 726 is a function of the internal trust 722 and the community trust 724, in the same record. The controller 150-2 calculates the internal trust 722, the community trust 724, and the total trust 726, as further described below with reference to FIG. 9.

Figure 8:
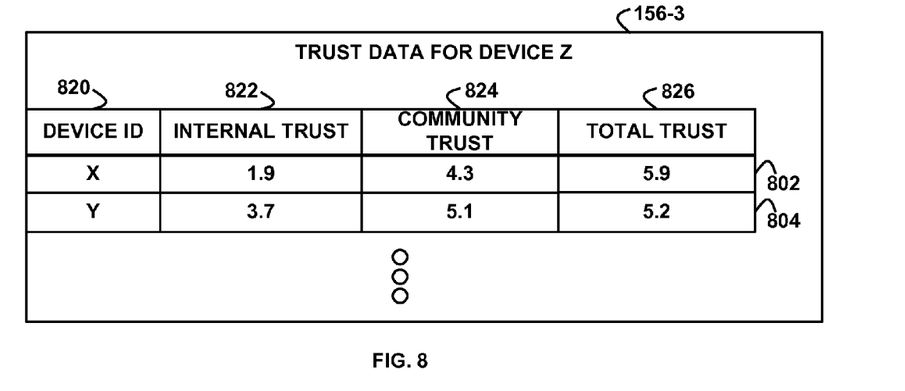
FIG. 8 depicts a block diagram of an example data structure for trust data for a device Z, according to an embodiment of the invention.

FIG. 8 depicts a block diagram of an example data structure for trust data 156-3 for a device Z, according to an embodiment of the invention. The trust data 156-3 comprises example records 802 and 804, each of which comprises an example device identifier field 820, an example internal trust field 822, an example community trust field 824, and an example total trust field 826. The device identifier field 820 identifies a computer device in the community of the device Z 100-3. Examples of the devices identified by the device identifier field 820 include the device X 100-1 and the device Y 100-2. The internal trust field 822 specifies the trust that the device Y 100-2 has for the device 820 in the same record. The community trust field 824 is the aggregate trust that the community, to which the device Z 100-3 belongs, has for the device 820 in the same record. The total trust field 826 is a function of the internal trust 822 and the community trust 824, in the same record. The controller 150-3 calculates the internal trust 822, the community trust 824, and the total trust 826, as further described below with reference to FIG. 9. The internal trust 822, the community trust 824, and the total trust 826 calculated by the device Z 100-3 for the devices identified by the device identifier 820 may be the same or different than the internal trust 622 and 722, the community trust 624 and 724, and the total trust 626 and 726 calculated by the respective device X 100-1 and device Y 100-2.

Figure 9:
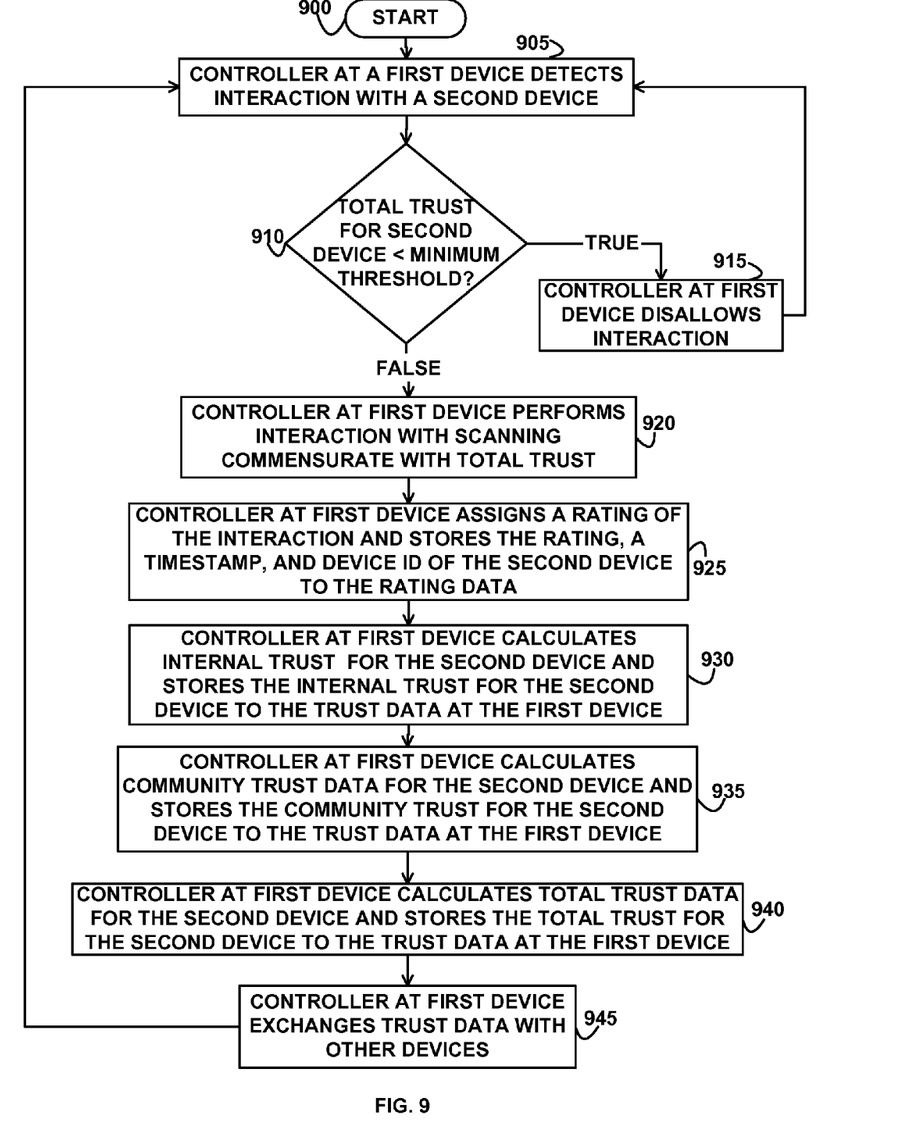
FIG. 9 depicts a flowchart of example processing of interactions with rating and trust data, according to an embodiment of the invention.

FIG. 9 depicts a flowchart of example processing for interactions with rating and trust data, according to an embodiment of the invention. The logic illustrated in FIG. 9 may be performed at each of the devices, such as the device 100-1, 100-2, and 100-3 in the network. Control begins at block 900. Control then continues to block 905 where the controller 150 at a first device detects an interaction with a second device.

Control then continues to block 910 where the controller 150 at the first device determines whether the total trust for the second device is less than a minimum threshold value of the total trust. If the controller 150 at the first device has not yet calculated the total trust for the second device, the controller 150 uses a default value for the total trust when making the determination. In an embodiment, the first device uses the default value of the community trust for the second device or another default value, set by a user or a system administrator via the user I/O device 121 if the community trust for the second device has not yet been calculated. If the determination at block 910 is true, then the total trust for the second device, as calculated by the first device, is less than a minimum threshold value of the total trust, so control continues to block 915 where the controller 150 at the first device disallows or prevents the interaction from starting, continuing, occurring, or completing, including preventing the transfer of data between the first device and the second device. Control then returns to block 905 where the controller 150 at the first device detects the same or a different interaction with the same or a different second device, as previously described above.

If the determination at block 910 is false, then the total trust for the second device, as calculated by the first device is greater than or equal to minimum threshold value of the total trust, so control continues to block 920 where the controller 150 performs, or allows the interaction to be performed, with a level of scanning commensurate with the total trust that the first controller 150 at the first device has calculated for the second device. Allowing the interaction to be performed stores code and/or data to the interactions 152. In various embodiments, the controller 150 performs a level of scanning of the data and/or code received from the second device that is proportional to the amount of total distrust. For example, the controller 150 divides various scanning activities into categories and assigns each category a priority or a risk. Examples of categories include scanning data for errors, scanning for errors or malware signatures, scanning some selected executable code for known virus or malware signatures, or scanning all code for known virus or malware signatures. The controller 150 then chooses the categories of scanning to perform on the received data and/or code based on the total trust for the second device. For example, if the total trust is high, then the controller 150 performs minimal scanning in the high priority or high risk categories; if the total trust is medium, the controller 150 performs the high priority scanning plus the medium priority scanning; and if the total trust is low (a high level of mistrust), the controller 150 performs all of the categories of scanning. The controller 150 further saves to the memory 102 indications of any errors or malicious code found by the scan, for later use in assigning a rating to the interaction. Control then continues to block 925 where, after the interaction completes, the controller 150 at the first device assigns a rating for the interaction and stores the rating, a timestamp, and a device identifier of the second device to the rating data 154.

Control then continues to block 930 where the controller 150 at the first device calculates the internal trust data (622, 722, or 822) for the second device. In an embodiment, the controller 150 calculates the internal trust (622, 722, or 822) via the following equation:

$$I_{AB}=I_{init}+\Sigma R_{ABn}/(t_{ABn})^d,$$

where the controller 150 calculates the sum over the range of n=1 to $N_{AB}$, and where "A" represents the first device, and "B" represents the second device.

$I_{AB}$ is the internal trust 622, 722, or 822 that the first device has for the second device. $I_{AB}$ is greater than or equal to the minimum trust value ($T_{min}$) and less than or equal to the maximum trust value ($T_{max}$). Thus, if $I_{AB}$ is greater than $T_{max}$, then the controller 150 sets $I_{AB}$ to $T_{max}$. If $I_{AB}$ is less than $T_{min}$, then the controller 150 sets $I_{AB}$ to $T_{min}$.

$T_{max}$ is the maximum, or upper bound, of a trust value $I_{AB}$.
$T_{min}$ is the minimum, or lower bound, of a trust value $I_{AB}$.
$I_{init}$ is the initial trust value that the first device has for any unknown device with which the first device has not had an interaction. $I_{init}$ is greater than or equal to $T_{min}$ and less than or equal to $T_{max}$. A value of $I_{init}$ within a threshold value of $T_{min}$ indicates a default distrust of unknown member devices and a value of $I_{init}$ within a threshold value of $T_{max}$ indicates a default trust of unknown member devices. In an embodiment, the controller 150 sets $I_{init}$ to be the community trust (624, 724, or 824) that the community has for the device that is unknown to the first device. If the community trust has not yet been calculated, the controller 150 sets $I_{init}$ to be a default value read from the user I/O device 121, received from the network 130, or received from an application.

$R_{ABn}$ is the rating value 324, 424, or 524 of the interaction n between the first device and the second device. Using the example of FIG. 3, for a first device of the device X 100-1 and a second device of the device Y 100-2 (record 302), $R_{ABn}=1$ when n=1 and $R_{ABn}=4$ when n=2.

$N_{AB}$ is the number of interactions 152 that have occurred between the first device and the second device. Using the example of FIG. 3, for a first device of the device X 100-1 and a second device of the device Y 100-2 (record 302), $N_{AB}=2$ because the record 302 has two ratings ("1" and "4") specified by the rating 324.

The time dampening constant is represented by d. Smaller values of d reduce the dampening impact that the passage of time has on the contribution of past interaction ratings on the current internal trust value. The time dampening constant d is greater than or equal to zero and less than or equal to one.

Thus, in an embodiment, the controller 150 calculates the internal trust $I_{AB}$ by adding the initial trust value, $I_{init}$, that the first device has for any unknown network device members plus the sum of all of the rating values $R_{ABn}$, for the past interactions 152 between the first device and the second device, divided by the length of time since the occurrence of the interaction, raised to an exponent of the time dampening constant. Thus, depending on the value of the time dampening constant, the controller 150 attenuates the rating values by the amount of time $t_{ABn}$ since the occurrence of the interaction.

Control then continues to block 935 where the controller 150 at the first device calculates the community trust data (624, 724, or 824) for the second device. In an embodiment, the controller 150 calculates the community trust (624, 724, or 824) via the following equation:

$$C_{AB}=[\Sigma(T_{mB})*(T_{Am})/(T_{max})]/\Sigma(T_{Am})/(T_{max}),$$

where the controller 150 at the first device calculates both of the sums over the range of m=1 to $M_{AB}$ where $T_{Am}$ is greater than zero, where "A" represents the first device, where "B" represents the second device, and where "m" identifies a member device in the community to which the first device and the second device belong.

$C_{AB}$ is the aggregate trust that the community (to which the first device belongs) has for the second device. The controller 150 at the first device calculates $C_{AB}$ as the weighted average of the trust values $T_{mB}$ that the members of the first device's community have for the second device multiplied by the adjusted trust value $T_{Am}$ that the first device has for each of the respective network device members. The controller 150 at the first device adjusts $T_{Am}$ proportionally, such that $T_{Am}$ is greater than or equal to zero and less than or equal to one.

$M_{AB}$ is the number of members of the first device's community that have an established internal trust value for the second device.

$T_{mB}$ is the trust value that the member device m has for the second device. In various embodiments, the controller 150 at the first device sets $T_{mB}$ to be either $I_{mB}$ (the internal trust that the member device m has for the second device) or $T_{mB}$ (the total trust that the member device m has for the second device). If the trust data has not yet been received from the member device m, then the controller 150 at the first device sets $T_{mB}$ to be an initial, default value.

$T_{Am}$ is the trust that the first device has in the network device member m. In various embodiments, the controller 150 at the first device sets $T_{Am}$ to be either $I_{Am}$ (the internal trust calculated by the logic of block 930) or $T_{Am}$ (the total trust calculated by the logic of block 940). If the logic of block 940 has not yet been executed, then in various embodiments, the controller 150 at the first device either sets $T_{Am}$ to be $I_{Am}$ or sets $T_{Am}$ to an initial, default value.

Control then continues to block 940 where the controller 150 at the first device calculates the total trust data (626, 726, or 826) for the second device. In an embodiment, the controller 150 at the first device calculates the total trust (626, 726, or 826) via the following equation:

$$T_{AB}=(1-c)*(I_{AB})+c*C_{AB}, \text{where "A" represents the first device and "B" represents the second device.}$$

$T_{AB}$ is the total trust, as a combination of the first device's internal trust for the second device and the first device's community's trust, which the first device has for the second device.

The community trust constant, c, is greater than or equal to zero and less than or equal to one. If c=1, then the controller 150 at the first device derives $T_{AB}$ entirely from the community trust that the community of the first device has for the second device. If c=0, then the controller 150 at the first device derives $T_{AB}$ entirely from the first device's internal trust value for the second device. Values of c between 1 and 0 factor both trust metrics into the calculation and act as weights for $I_{AB}$ and $C_{AB}$ in the calculation of $T_{AB}$. In various embodiments, the controller 150 at the first device receives the community trust constant c from the user I/O device 121, from a system administrator, or from another computer via the network 130.

Thus, the total trust that a first device has for a second device is a weighted combination of factors: the internal trust that the first device has for the second device plus the trust that the first device's community has for the second device, where the weights given to each factor are determined by the community trust constant.

Control then continues to block 945 where the controller 150 at the first device exchanges trust data 156 with other devices, sending the trust data calculated by the controller 150 at the first device to other devices in the network and receiving trust data calculated by other devices in the network. For example, the controller 150-1 at the device x 100-1 sends the trust data 156-1 to the device Y 100-2 and the device Z 100-3 and receives and stores to the memory 102 the trust data 156-2 and the trust data 156-3 from the device Y 100-2 and the device Z 100-3, respectively. Control then returns to block 905 where the controller 150 at the first device detects the same or a different interaction with the same or a different second device, as previously described above. Thus, an embodiment of the invention autonomously establishes trust levels among member devices in a network.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of the stated features, integers, steps, operations, elements, and/or components, but do not preclude the presence or addition of one or more other features, integers, steps, operations, elements, components, and/or groups thereof.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, embodiments of the invention may be practiced without these specific details. In other instances, well-known circuits, structures, and techniques have not been shown in detail in order not to obscure embodiments of the invention. Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense.

What is claimed is:

1. A method comprising:
   detecting at a first device, a first interaction between the first device and a second device, wherein the detecting further comprises detecting at the first device, a plurality of interactions between the first device and a second device;
   assigning, at the first device, a first rating of the first interaction, wherein the assigning further comprises assigning, at the first device, respective ratings of the plurality of interactions;
   calculating, at the first device, an internal trust that the first device has for the second device based on the respective ratings and respective times since the occurrence of the plurality of interactions, wherein the calculating, at the first device, the internal trust that the first device has for the second device based on the respective ratings and respective times since the occurrence of the plurality of interactions further comprises adding an initial trust value that the first device has for an unknown device plus a sum of the respective ratings of the plurality of interactions, divided by the respective times since the occurrence of the plurality of interactions, raised to an exponent of a time dampening constant;
   receiving, at the first device, trust data from a third device;
   calculating, at the first device, a community trust for the second device based on the trust data and an internal trust that the first device has for the third device;
   calculating, at the first device, a total trust that the first device has for the second device based on the community trust and the internal trust that the first device has for the second device; and
   if the total trust is less than a minimum threshold, disallowing, at the first device, a second interaction between the first device and the second device.

2. The method of claim 1, wherein the receiving further comprises:
   receiving, at the first device, respective trust data from a plurality of devices.

3. The method of claim 1, further comprising:
   if the total trust is greater than the minimum threshold, allowing the second interaction and performing a scan of the second interaction at a level commensurate with the total trust.

4. The method of claim 1, wherein the second interaction is subsequent to the first interaction.

5. The method of claim 1, wherein the internal trust represents a level of confidence the first device has in data provided by the second device to the first device.

6. The method of claim 1, wherein the trust data represents a level of confidence that the third device has in data provided by the second device to the third device.

7. A non-transitory computer-readable storage medium encoded with instructions, wherein the instructions when executed comprise:
   detecting at a first device, a plurality of interactions between the first device and a second device;
   assigning, at the first device, respective ratings of the plurality of interactions;
   calculating, at the first device, an internal trust that the first device has for the second device based on the respective ratings and respective times since an occurrence of the plurality of interactions, wherein the calculating, at the first device, the internal trust that the first device has for the second device based on the respective ratings and respective times since the occurrence of the plurality of interactions further comprises adding an initial trust value that the first device has for an unknown device plus a sum of the respective ratings of the plurality of interactions, divided by the respective times since the occurrence of the plurality of interactions, raised to an exponent of a time dampening constant;

receiving, at the first device, respective trust data from a plurality of devices;

calculating, at the first device, a community trust for the second device based on the respective trust data and respective internal trusts that the first device has for the plurality of devices;

calculating, at the first device, a total trust that the first device has for the second device based on the community trust and the internal trust that the first device has for the second device; and if the total trust is less than a minimum threshold, disallowing, at the first device, a second interaction between the first device and the second device, wherein the second interaction is subsequent to the plurality of interactions.

8. The non-transitory computer-readable storage medium of claim 7, further comprising:

if the total trust is greater than the minimum threshold, allowing the second interaction and performing a scan of the second interaction at a level commensurate with the total trust.

9. The non-transitory computer-readable storage medium of claim 7, wherein the internal trust that the first device has for the second device represents a level of confidence the first device has in data provided by the second device to the first device, and wherein the respective trust data represents a respective level of confidence that the plurality of devices has in data provided by the second device to the plurality of devices.

10. The non-transitory computer-readable storage medium of claim 7, wherein the calculating, at the first device, the community trust for the second device based on the respective trust data and respective internal trusts that the first device has for the plurality of devices further comprises:

calculating a weighted average of trust values that the plurality of devices have for the second device multiplied by the respective internal trusts that the first device has for the plurality of devices.

11. The non-transitory computer-readable storage medium of claim 10, wherein the calculating, at the first device, a total trust that the first device has for the second device based on the community trust and the internal trust that the first device has for the second device further comprises:

calculating the total trust to be a weighted of the internal trust that the first device has for the second device and the community trust.

12. A computer system, comprising:

a processor; and memory communicatively coupled to the processor, wherein the memory is encoded with instructions, wherein the instructions when executed on the processor comprise:

detecting at a first device, a plurality of interactions between the first device and a second device, assigning, at the first device, respective ratings of the plurality of interactions, calculating, at the first device, an internal trust that the first device has for the second device based on the respective ratings and respective times since an occurrence of the plurality of interactions, wherein the calculating, at the first device, the internal trust that the first device has for the second device based on the respective ratings and respective times since the occurrence of the plurality of interactions further comprises adding an initial trust value that the first device has for an unknown device plus a sum of the respective ratings of the plurality of interactions, divided by the respective times since the occurrence of the plurality of interactions, raised to an exponent of a time dampening constant, receiving, at the first device, respective trust data from a plurality of devices, calculating, at the first device, a community trust for the second device based on the respective trust data and respective internal trusts that the first device has for the plurality of devices, calculating, at the first device, a total trust that the first device has for the second device based on the community trust and the internal trust that the first device has for the second device, and if the total trust is less than a minimum threshold, disallowing, at the first device, a second interaction between the first device and the second device, wherein the second interaction is subsequent to the plurality of interactions.

13. The computer system of claim 12, wherein the instructions further comprise:

if the total trust is greater than the minimum threshold, allowing the second interaction and performing a scan of the second interaction at a level commensurate with the total trust.

14. The computer system of claim 12, wherein the internal trust that the first device has for the second device represents a level of confidence the first device has in data provided by the second device to the first device, and wherein the respective trust data represents a respective level of confidence that the plurality of devices has in data provided by the second device to the plurality of devices.

15. The computer system of claim 12, wherein the calculating, at the first device, the community trust for the second device based on the respective trust data and respective internal trusts that the first device has for the plurality of devices further comprises calculating a weighted average of trust values that the plurality of devices have for the second device multiplied by the respective internal trusts that the first device has for the plurality of devices, wherein the calculating, at the first device, a total trust that the first device has for the second device based on the community trust and the internal trust that the first device has for the second device further comprises calculating the total trust to be a weighted of the internal trust that the first device has for the second device and the community trust.

* * * * *